United States Patent [19]

Rorden

[11] Patent Number: 4,787,093
[45] Date of Patent: Nov. 22, 1988

[54] COMBINATORIAL CODED TELEMETRY

[75] Inventor: Louis H. Rorden, Los Altos, Calif.

[73] Assignee: Develco, Inc., San Jose, Calif.

[21] Appl. No.: 907,727

[22] Filed: Sep. 15, 1986

Related U.S. Application Data

[63] Continuation of Ser. No. 477,003, Mar. 21, 1983, abandoned.

[51] Int. Cl.[4] .............................................. H03K 7/00
[52] U.S. Cl. ........................................ 375/23; 375/58;
375/96; 340/861; 371/37
[58] Field of Search ............ 375/23, 37, 96, 106;
360/44, 46; 340/870.01, 870.19, 870.22, 348,
354; 367/81, 82, 83; 371/37, 39, 40, 42, 43, 46;
370/10, 18

[56] References Cited

U.S. PATENT DOCUMENTS

| 3,519,746 | 7/1970 | Gutleber | 340/354 |
| 4,027,301 | 5/1977 | Mayer | 340/870.22 |
| 4,095,226 | 6/1978 | Kratzer | 375/115 |
| 4,114,138 | 9/1978 | Demers | 340/870.22 |
| 4,430,652 | 2/1984 | Rothenbuhler et al. | 375/23 |

Primary Examiner—Benedict V. Safourek
Attorney, Agent, or Firm—Harry E. Aine

[57] ABSTRACT

A unipolar, RZ, constant width pulse telemetry is achieved in the combinatorial set, or any desired subset of pulse sequences thereof. Each input datum W is in one-to-one correspondence with a particular pulse sequence and the correspondence of datum with pulse sequence and vice versa is implemented by any selected ordering of the pulse sequences of the combinatorial set together with a successive comparison of the magnitude of the datum with the cumulative combinatorial capacity of the set.

5 Claims, 5 Drawing Sheets

Fig_1

Fig_3a

Fig_4b

Fig.4a

Fig_5

Fig_6

COMBINATORIAL CODED TELEMETRY

RELATED CASES

The present invention is a continuation invention of co-pending parent application U.S. Ser. No. 477,003 filed Mar. 21, 1983 now abandoned.

FIELD OF THE INVENTION

The present invention relates to telemetry and more particularly to communication of data between downhole sensors and the surface of the earth in the course of operation of a measuring-while-drilling system.

BACKGROUND OF THE INVENTION

In recent years, well drilling systems have been demonstrated wherein sensors of various types located close to the drill bit have provided information in real time for control and analysis of the drilling procedure itself and for the evaluation of geological data. Representative information such as hole direction, tool face angle inclination, weight and torque-loading of the bit are clearly important data from which drilling rig operational efficiency depends. Other information, such as electrical resistivity of local strata, natural gamma-ray spectra and vector magnetometer data provide information for assessing the geologic nature of the surrounding strata. These and other parameters can be measured to high precision and there results a telemetry problem in providing a data transmission system which can accomodate an acceptable signal-to-noise ratio at an acceptable data rate. As well as conveying survey data to the surface, this telemetry facilitates transmission of control parameters to the drilling tool itself.

Straightforward electrical transmission across drill string components requires adaptation of those components to provide the required insulated conductors and reliable electrical couplings. These requirements introduce a plurality of vulnerable components in an extremely hostile environment promoting the likelihood of communication failure.

Another transmission means of particular interest exploits the drilling fluid (mud) circulated through the drill string and returned to the surface. The mud pressure can be modulated or an acoustic carrier wave can be developed at the downhole transmitter or at the surface for propagation through the drilling fluid to the acoustic receiver. Modulation techniques of various types have been utilized for impressing information on the carrier for processing at the receiver. Fast mud valves for creating pressure pulses, mud sirens and variants thereof for generating an acoustical carrier are described in a number works, representative of which are systems discussed in U.S. Pat. No. 4,215,425 and U.S. Pat. No. 4,215,427. Other references to the general state of the art are to be found in Patton et al, J. Pter. Tech., v, October 1977; Gearhart et al, J. Petr. Tech., v., 1980.

It is apparent that the data channel for mud pulse telemetry is exceedingly noisy owing to the mechanical generation of broadband noise and to the drilling fluid circulation system. A signal-to-noise ratio which will sustain acceptable demodulation can be achieved with lengthy pulse integration with data rate reduced accordingly; however, pulse integration times are further limited by the characteristics of the channel. For example, the static pressure level or the baseline of a modulated carrier is subject to drift at a rate which effectively limits pulse width, necessitating a return-to-zero (hereafter "RZ") format for reliable pulse detection. Thus, in any pulse code modulation, variations in a relevant base line parameter (pressure, frequency, phase or the like) is compensable by establishing pulse windows in time separated by no pulse intervals during which the base line parameter is monitored.

In particular, direct pressure modulation requires operation of a mud pressure valve against an ambient pressure of the order of some $10^3$ psi to produce a pressure increment of 50–200 psi with a rise and fall time of the order of tenths of seconds for pulse intervals of the order of a few seconds. Reproducibility of valve performance deteriorates with erosion of valve parts and wear on seals consequent to these demands and power requirements for securing these operating specifications are nontrivial. It is therefore desirable for the pulse to be efficient in order to reduce the valve duty cycle and total number of valve actuations in order to conserve power and prolong the operating life of the valve.

In order that conventional parlance be disturbed as little as possible, the use herein of the terms "code", "encode" and "decode" wil be understood to refer to the relationship of data symbols to the modulation of the communication channel, eg, the transformation and its inverse for associating the symbol with its physically realized modulation. Thus "modulation" retains its conventional connotation referenced to a carrier or baseline pressure (carrier of zero frequency). It will be apparent that the present invention, directed as it is to the aforementioned relationship and transformations, can support various schemes from which data compression, error correction and the like can be implemented.

Accordingly, it is an object of the present invention to provide an improved telemetry for measuring-while-drilling systems.

BRIEF DESCRIPTION OF THE INVENTION

The present invention concerns method and apparatus for telemetry which communicate input information over a noisy channel subject to substantial baseline drift in amplitude and rate for the modulation selected. Information is processed in block form for transmission in fixed time intervals $T_w$ per block in a manner which results in the maximum possible data rate subject to the restrictions imposed by channel considerations. By exploiting the combinatorial capacity of the fixed time interval for transmission of discrete pulses localized in time displacement of the leading edge thereof to N uniformly distributed discrete positions within $T_w$, all possible pulse patterns can be used in the present invention. Because the code capacity is a combinatorial function of the elements of the time structure of the block or message interval, the rate at which information is transmitted is the maximum which can be achieved subject to the constraints which are introduced to overcome signal degrading effects associated with the channel.

Given an input symbol W, a particular pulse sequence is obtained by a successive determination process which selects that pulse sequence uniquely associated with W.

The present invention is implemented by synchronizing the transmitter and receiver, and providing a precise time division of the fixed time interval $T_w$ into a fixed number of N subintervals for communication of information contained in a word, W. W is a single parameter of some fixed number of bits or a concatenation of a plurality of independently developed parameters, which for present purposes may be regarded as a single digital word. It is emphasized that W is one of any ordered set of symbols. It will most easily serve for illustrative purposes for W to be regarded as a binary datum, merely because that form of data expression is so widely practiced, or simply an integer no greater than some maximum, X. The value, eg. content of W is then transformed or encoded in accordance with a correspondence of the present value of the datum W to one of the combinatorial set of a number of M nominally identical pulses distributed over the N available subintervals of $T_w$. Mud pulse (acoustic) transmission channels, particularly exhibit an unstable baseline thereby degrading the detection and demodulation of the pulse. There is, therefore, a strong preference for an RZ format for the code. As a result, the combinatorial encoding is best constrained by imposing a no-pulse period following each pulse, including a mandatory no-pulse period terminating each transmission interval $T_w$.

The time structure of the message interval is specified by a decision interval $T_d$ the size of which is determined by channel dependent considerations of signal-to-noise ratio, expected error rate and instrumental considerations of time resolution and jitter which must be satisfied by various system components. Division of the message interval $T_w$ into $N*T_d$ time units defines the number of apparent pulse start times. The finite pulse width $T_p$ and the RZ constraint limit the available start times. The parameterization of these properties is obtained by relating the pulse with $T_p$ to the decision time $T_d$ through a quantity $$L=(T_p+T_{mp})/T_d$$

where $T_{mp}$ represents a time interval adjacent the pulse during which time no information is impressed on the channel. This definition incorporates the RZ constraint in general fashion. A specific choice $T_p=T_{mp}$ is preferred for the practice of the invention but is not otherwise a requirement thereof. This definition incorporates the RZ constraint in a specific manner: the time allotted for a pulse is twice the pulse width to yield a no-pulse interval $T_{mp}=T_p$ for every pulse emitted.

In one embodiment of the invention, the maximum number of pulses comprising the code is fixed and the number of pulses available for encoding the value of W is permitted to vary over a subset of the possible range of pulse numbers M, where M ranges from 0 to the integer portion of $T_w/(T_p+T_{mp})$. This upper limit measures the number of possible pulse intervals in the message interval $T_w$. In another embodiment, the number of pulses M is fixed at one value in the above range and that constraint thereby supplies additional indicia for error detection. In either embodiment the channel capacity is a combinatorial function of M pulses and N−L available pulse positions in $T_w$ for accomodating a pulse of specified width.

The basis for the present encoding follows from the combinatorial association of M pulses to be emitted within a fixed interval of N time units subject to a minimum spacing in time units, the total RZ pulse width $(T_p+T_{mp})$ occupying L units. The large number of available combinations are ordered in the present invention to create hierarchies of the pulse combinations based upon the time displacement of respective pulses from the time origin of the fixed message interval.

DETAILED DESCRIPTION OF THE INVENTION

Figure 1:
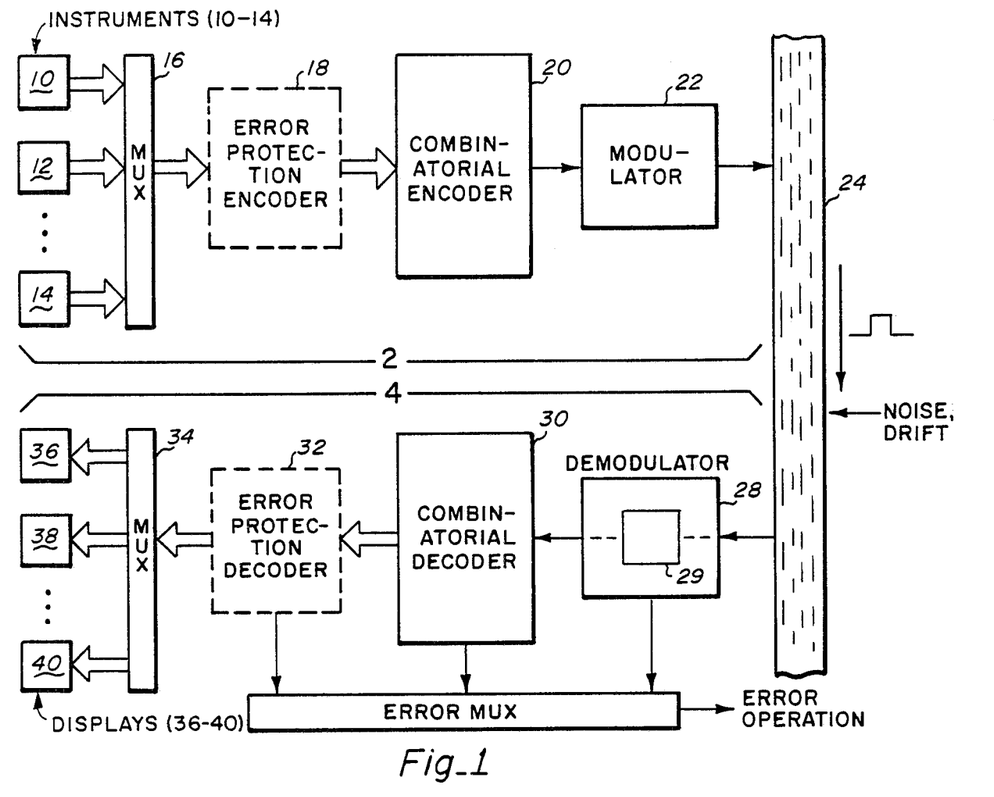
FIG. 1 describes the context of the present invention.

The context of the invention is best described with the aid of FIG. 1 which depicts a sending terminal 2 and recieving terminal 4 of a telemtry system. Either terminal can be identified with the surface or downhole portions of a measuring-while-drilling system depending upon the direction of transmission. For specificity it may be assumed without loss of generality that data originates downhole for display, recording or actuation at the surface. The reverse direction for communication is trivially within the scope of the invention.

Data originating with instruments 10, 12 or 14 are read by multiplexer 16 which may be operated to select a particular instrumental datum for transmission. A preferred mode for multiplexer 16 is the assembly of all data and concatenation thereof to form a binary datum W. Where it is necessary or desirable to update knowledge of certain parameters at a relatively higher rate, the ability to select one or more parameters for telemetry is clearly a matter of simple design choice.

Error protection apparatus 18 is desirable to implement an error detection or correction scheme, many of which are well known and need not be described in detail. For simplicity, the error protection system will be regarded as implementing a parity checkword for appending to the concatenated datum for transmission as an integral portion thereof.

The datum W including the parity checkword is now processed by the combinatorial encoder 20, the operation of which is more completely described below. The output of the encoder is a serialized code for impression upon a time base within a fixed time interval $T_w$. It is the function of modulator 22 to realize the serialized code as a train of time displaced transients (pulses) impressed on a parameter of the channel 24. The present invention is primarily directed to establishing a reliable telemetry based upon acoustic transmission through the drilling fluid which is circulated under pressure between the drill tool and the surface. Many modulation techniques are adaptable to such a channel, and to the present invention in particular. In common, such methods modulate a characteristic of the acoustic energy propagation within the pressurized drilling fluid and a number of such modulation techniques have been implemented for measuring-while-drilling telemetry. The most basic example is the modulation of the dc pressure level in the circulating fluid by means of a valve arranged to permit an increment to, or decrement from the baseline pressure. Such apparatus is well known in the art. This form of modulation directly propagates an acoustic pulse across the channel 24 for detection by demodulator 28. Noise and channel characteristics inevitably degrade the quality of the signal and influence the nature of the pulse code format. A particular characteristic of the acoustic and pulse telemetry is the unpredictable time dependence in the baseline pressure. Many factors can influence this time dependence and it is essential that baseline treatment phenomena and longer variations be distinguishable from the modulation. A unipolar modulation is desirable in the present context because pulse modulation based thereon can be achieved in a simple fluid circuit incorporating a valve to directly affect the pressure in the circulating fluid.

The frequency band available for mud pulse communication is limited to a range of a few tenths of a Hertz to a few Hertz. Low frequency noise, appearing as a baseline pressure drift, is due principaly to poor regulation of the pump speed and intentional modifications of flow rate by the driller where rotary drilling is employed. Much more severe fluctuations are experienced in mud motor drilling owing to changes in bit torque due to corresponding variations in the local formation and also by the technique employed for maintaing bit weight. High pressure ripple at frequencies as low as $\frac{1}{2}$ Hz and typically 1 to 2 Hz. with harmonics, are generated by the piston type mud pump. Unless sophisticated pump ripple neutralization is used, the pulse width for mud pulse telemetry must be kept narrow enough to allow baseline drift compensation yet wide enough to avoid pump ripple interference.

It is therefore necessary to structure the code in such manner that the baseline is monitored before and after each pulse to compensate for baseline instability. RZ code formats impose an interval $T_{mp}$ following each pulse, during which the baseline is monitored to compensate this time dependence. In this no-pulse period no pulse modulation is impressed upon the baseline pressure (or carrier) permitting integration of a relevant baseline condition for compensating the adjacent pulse period. The data rate and signalling efficiency are reduced in proportion to the total of $M \times T_{mp}$: it is therefore of extreme importance that the the code be inherently efficient to offset the dead time overhead of the RZ format. Correlators for establishing the base line condition before and after the pulse period are known for this purpose and form the basis for demodulator 28. A particular correlator 29 especially suitable to an RZ pulse format in the presence of a time dependent baseline is discussed below.

The serialized pulse code M(t) spanning the time interval $T_w$ is processed by combinatorial decoder 30 in the manner described below to recover symbolic representation of W including any appended redundancy for error checking. The receiver error decoder operates upon such redundancy to detect error conditions and initiate appropriate error recovery action. Error protector apparatus 18 and receiver error decoder 32 may be of the class of apparatus which implements forward error correction capability which will act to locate the error and correct same if the error is within the specific correction capability of this apparatus. The incidence of uncoverable error, or the simple detection of error by computation of the parity checkwork and comparison with the transmitted parity checkword, likewise initiates the error condition. Further indicia of error can appear during the operation of combinatorial decoder 30. It will be understood that the system is adapted to undertake a desired action, eg. initiate a re-transmission or simply to re-initiate the entire data acquisition process based upon newly acquired data developed in the interim.

Correct data is then directed through multiplexer 34 to respective display, recording or actuation devices 36, 38 or 40.

In the system described, the transmission of information is accomplished by a pulse sequence requiring synchronization between transmitter and receiver. Synchronization is understood to be achieved by any of a number of conventional means. A unique pulse sequence is commonly employed to establish synchrony. The information contained in the information unit W must be transmitted in an interval $T_w$ independent of the information content of W: the synchronization establishes the leading edge in time of this interval.

Figure 2:
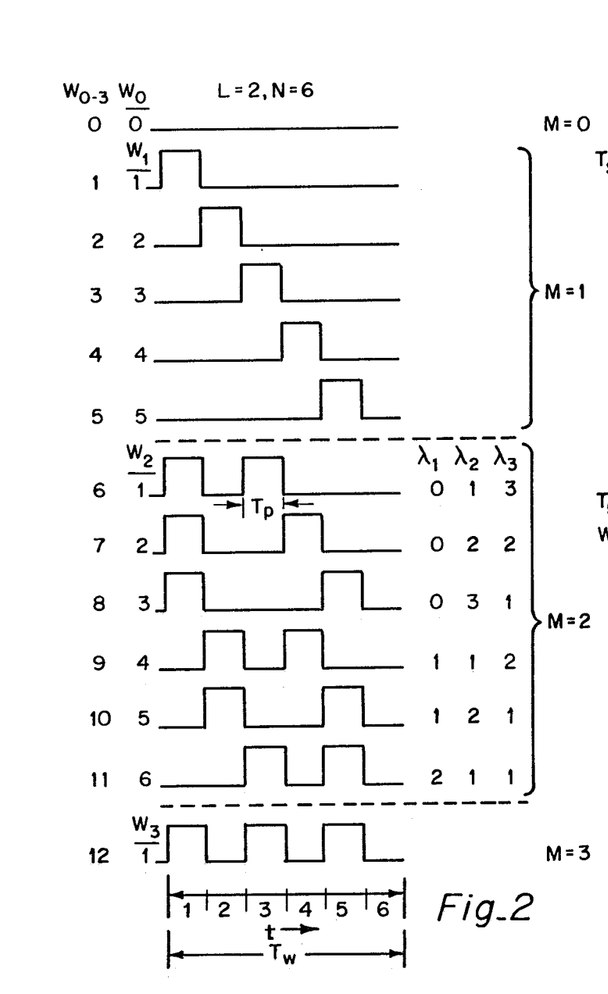
FIG. 2 is a simplified example of a time displaced combinatorial code of the present invention.

The period $T_w$ is divided into a number of subintervals, which for the limited purpose of this portion of the exposition can be taken as pulse intervals of width $T_p$ followed by no-pulse intervals of width $T_{mp}$. Although it is not a limitation of the invention, the intervals $T_p$ and $T_{mp}$ are set equal by preference in the case of the acoustic mud pulse channel for reasons discussed below. The several intervals $T_p$, $T_{mp}$ ... form an ordered sequence of time slots which divide the message interval $T_w$ into portions of various lengths as shown in the simple expository model of FIG. 2. The example depicts a fixed message interval $T_w$ divided into 6 equal intervals of width $T_p$. The present invention exploits the time displaced location of pulses within $T_w$ to establish a unique representation for an information unit W. In accord with the invention, that information is encoded as a distribution of M unipolar pulses over the available time slots in respect of a combinatorial sequence spanning the possibly values of W. A fixed value for the number of pulses M is one embodiment for the combinatorial basis of the coding process which provides an enhanced means for error detection in providing an additional constraint upon the number of received pulses. Another embodiment is readily implemented wherein M may take on any value up to $M_{max}$ where $M_{max}$ is given by $T_w/(T_p+T_{mp})$ thereby providing additional information capacity for the coded channel. Error indicia are also available in this instance where the total number of received pulses must be less than $M_{max}$. In straightforward fashion the number of pulses, whether fixed for all values of W or the alternative values of a subset, form a simple error criteria which supplements the operation of any other error protection. Moreover this criteria is invoked at an earlier stage of the process. In the example of FIG. 2, correspondences to a magnitude W for two embodiments are evident at the left margin of FIG. 2. Still further refinement is available by providing for a desired subset of the possible values of M. Thus in FIG. 2, a restriction to M=2 or 3 accommodates a 7 symbol alphabet. In a larger pulse code (M,N) a subset may comprehend either contiguous values of M or non-contiguous values in accord with the requirements of the data to be transmitted and considerations pertinent to the error protection measure desired.

For the simple example under discussion, a maximum of 3 pulses can be accommodated subject to the stated constraints within the message period. If the time displaced pulse slots (RZ format) were weighted in accord with a conventional binary coding scheme, the channel would support $2^3=8$ symbols at a rate of 0.5 bits/pulse wdith. It is apparent for the example that the number of symbols accommodated is increased in comparison with such binary weighted code and the equivalent bit rate is similarly increased.

In the example, the occurrence of a single pulse can occur for any one of the five available intervals, thereby encoding as many as five symbols. (The sixth must appear as a no-pulse period.) Two pulses may be distributed among the five available pulse positions in six distinct ways, subject to the constraint of non-adjacency of pulses. An additional six symbols may be defined from a two pulse sequence. Finally, three pulses may be distributed on the field of five slots in one way contributing one further symbol to code capacity. Four pulses cannot be accomodated subject to the constraints expressed.

If any of the 1, 2 or 3 pulses are permitted (M=0 is here ignored), a 12 symbol alphabet is achieved for a numerical precision of one part in 12. By encoding 12 symbols instead of $2^3$, within the identical message interval T the equivalent bit rate rate or signalling efficiency is increased from 3 bits/$T_w$ to 3.6 bits/$T_w$ or 0.6 bits/pulse width. If a fixed number of 2 pulses is the only permitted sequence within the 6 slot field, only 6 symbols are supported and the bit rate is 2.6 bits/$T_w$. It is well known that for integers M and N generally, the number of ways wherein M nominally identical objects can be distributed (without further constraint) over N distinguishable containers (with capacity to hold one such object) is given by the binomial coefficient $$C(N,M) = n!/(M!(N-M)!)$$

which clearly can exceed $2^N$. Therefore a fixed number of M pulses distributed over N time intervals, each of width $T_p$, also enables the encoding of a larger alphabet or greater digital precision than can be accomplished in the conventional binary code weighted over the same interval and subject to the same constraints.

It is instructive to consider the exemplary combinatorial code of FIG. 2 from the perspective of the intervals defined by the pulses distributed on $T_w$. For any M pulses, M+1 such intervals are determined by the position of the M pulses which may be regarded as punctuation. Thereby, (N−M) time slots are grouped among the M+1 intervals as indicated in the table to the right of the 2-pulse subset of FIG. 2. For the two-pulse code these intervals are characterized by specific magnitudes. The first interval ranges from 0 to 2 units in length. The second and third interval range from 1 to 3 units, thereby satisfying the RZ (no-pulse adjacent) constraint. The total available time for the three intervals comprises four units, eg. six time slots minus two pulse intervals. Two of those time slots are required for the minimum widths of the second and third intervals. The interval magnitudes are therefore not independent.

In further consideration of the two pulse subset of the expository model of FIG. 2, the first symbol or minimum value of W which is encoded in the fixed two pulse sequence is expressed as pulse emission in the earliest and most compact portion of the message interval. This is the ordering principle which, taken together with the combinatorial capacity of the pulse patterns, forms the coding method. The progression of combinatorial assignment continues in accord with the present invention to the final symbol or greatest value of W which is realized in the most compact and latest portion of the mesage interval, that is following the maximum permissible delay. Therefore, the preferred encoding procedures pallindrones at the extrema of its coded alphabet. It is thus apparent that the preferred embodiment can as easily be implemented with the inverted weighting: the time origin can be considered at either end of the message interval, or in other words the ordering principle may be descending as well as ascending.

Figure 3A:
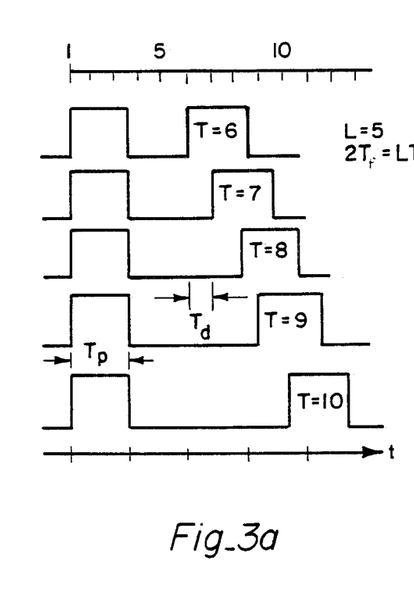
FIG. 3a illustrates the time structure for L=5.

A further enhancement in signal capacity is achieved by further dividing the message interval. Implicit in FIG. 2 is the assumption that the intervals $T_p$ quantize both the pulse width and the time displacement of pulses. FIG. 3a introduces a more basic increment $T_d$ and a parameter L relating $T_d$ to $T_p$. The minimum value of $(T_p + T_{mp})$ is set by the available channel bandwidth, and $T_p = T_{mp}$ by preference to maximize signal energy. $T_d$, of course is the signal resolution time and is selected on singal-to-noise considerations. Given apparatus capable of localizing pulses to an accuracy well within $T_d$, it is appreciated that further increase in combinatorial code capacity is realized by displacement of pulses through additional increments $T_d < T_p$, while continuing to honor the stated constraints. While the number of combinations will increase for decreasing $T_d$, a better time resolution is required to accurately establish pulse position. As the interval decreases, the accuracy in locating the pulse is burdened and ultimately limited by channel noise. The trade off between data rate and error rate is conveniently subsumed within the relationship of $T_d$ to $T_p$ and $T_{mp}$ which is here defined as $$L = (T_p + T_{mp})/T_d$$

This general definition treats the widths of the pulse portion and quiet portion of a pulse transmission as arbitrary in duration. The practice of the invention for alternative choices of relative duration of $T_p$ and $T_{mp}$ is straightforward but it is preferred that $T_p = T_{mp}$ resulting in the definition $$L = 2T_p/T_d$$

The prescription for the present encoding follows from the problem of distributing M identical items over a one dimensional field of fixed T length NT units where each of the items occupies L units. The number of possible combinations, for any selected set of integer values L, M, M is given by $$C(L,M,N) = (N+M(1-L))!/(M!*(N-ML)!)$$

It must be remarked that neither N nor L is restricted to integer values. Any noninteger portion of N, of course contributes to overhead. It may well be that such overhead is desirable to accommodate synchronization or the like. For the general case where only M is required to be integer the above expression for C (L, M, N) is given by $$C(L,M,N) = int(N+M(1-L))!/(M!(int(N-ML))!)$$

These expressions for C (L, M, N) that combinatorial capacity for a given value of M. A maximum possible value of M can always be found for the case where the message interval is uniformly density with pulses subject to the minimum spacing. This is merely the ratio N to L. Each value of M can contribute incremental signal capacity such that the maximum signal capacity is obtained by summing over M to obtain $$S(L,N) = \sum_{i=0}^{\text{inT}\left(\frac{N}{L}\right)} C(L,i,N)$$

The combinatorial capacity measured by S is the maximum which can be associated with the parameters L and N. It is also contemplated that a subset of the possible range of M is desired. It is advantageous to require such a restricted set of values for M to implement error protective measures. Thus there may be defined $$\hat{S}(L,N) = \Sigma C(L,\hat{M},N)$$

where the summation is carried out over the values of M comprising the selected subset denoted by $\hat{M}$.

The number of combinations measures the code capacity but does not establish the preferred encoding. The above expression for C (L,M,N) yields no rule for associating a particular combination of M pulses within the message period with a particular symbol or datum. The present invention imposes an ordering upon the various combinations which ordering is based upon the time displacement of pulses from the time origin or synchronization. There are numerous rules which will satisfy an ordering requirement and the selection of a particular convention for ordering of the pulse sequences into hierarchies of classes, sub-classes, sub-sub-classes, etc will often follow from the details of the system in its physical context. It is emphasized that the respective partial combinatorial capacities do not change for a change in the ordering convention. A particular ordering convention will be employed throughout without intent to limit the increased information capacity of this invention to a particular ordering convention.

A prefered and illustrative ordering convention for pulse sequences can be described as follows. The earliest pulse is labeled by the index j=1 and exhibits the shortest displacement from the time t=0. This defines a class of pulse sequences within which subsequent pulses define subclasses and sub-subclasses, etc again based upon the displacement of such jth pulse from the origin, or preceding pulse. For the final pulse, j=M, the displacement from the preceding pulse directly orders the members of this ultimate subclass. It remains merely to associate with the ordering described an associated ordering of input symbols. For simplicity that set of ordered input symbols will be taken to be the ordered set of integers in the range from 0 to S−1 or from any subset of S which may be desired from the various values of M. The association of pulse sequence with input symbol may be stored in a tabular array where the memory requirements are not excessive. Described below is a method for synthesizing the correct pulse sequence for modulation of the channel.

Figure 3B:
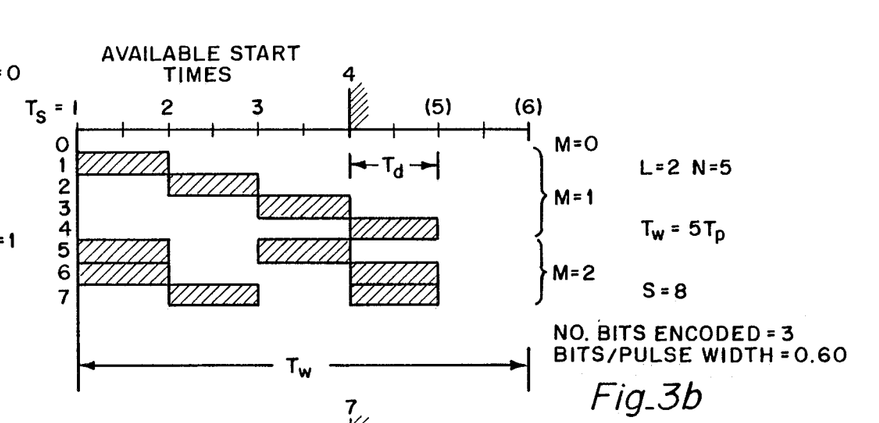
FIGS. 3b and 3c illustrate the effect of L on simple codes.
Figure 3C:
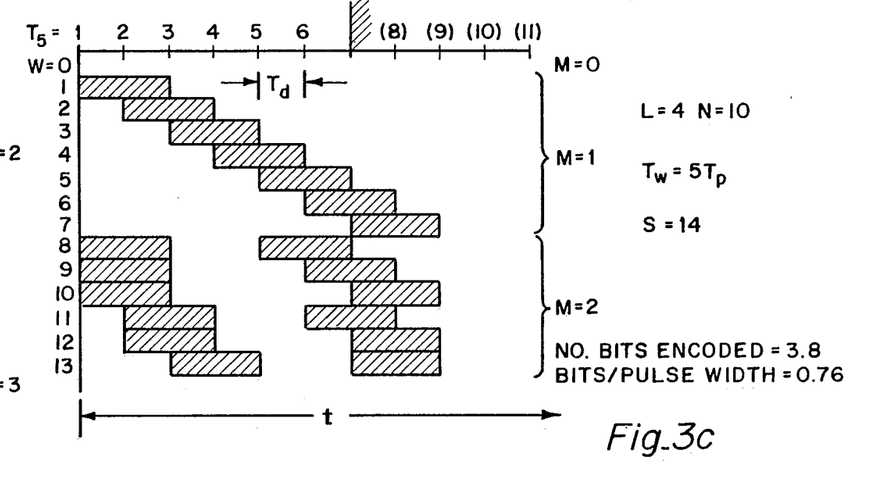

For the example of FIG. 2 the value L=2 was shown. FIG. 3a is an example of a portion of a pulse sequence wherein L=5. Further examples of the choice of L are apparent in FIGS. 3b and 3c for the codes (L, N)=(2, 5) and (4, 10). In this notation it will be understood that M refers to the number of pulses selected for encoding the datum to be transmitted. It is observed that the number of bits encodeable is generally increased as expected for the higher value of L and accordingly, the number of bits per pulse width is similarly increased. The examples of FIGS. 3b and 3c both comprehend $T_w = 5T_p$ but L=4 of FIG. 3c accomodates 3.8 bits compared with a maximum of 3.0 bits of FIG. 3b.

It is also noteworthy that combinatorial coding following the present invention permits a telemetry which efficiently accomodates a datum without regard to a particular number base: a fractional bit precision is realized without the necessity of invoking an additional bit. As a result transmission parameters, such as pulse width and the like can be optimized to secure a favorable signal-to-noise condition within an allowed bandwidth, while maintaining an enhanced information rate.

The discussion is aided by illustration in terms of the example of FIG. 2 because many of the salient features of the invention are present and clear in this simple form. It will be undertood that any realistic implementation of such "short" codes is most likely to be realized in tabular lookup apparatus. The operations which are requisite to such an implementation are also present in a real time encoder or decoder apparatus as described below. A ROM based system is limited by the size of the alphabet or range of distinct magnitudes presented for encoding. The present invention has as its greatest advantage when long blocks are encoded since the code efficiency continuously increases with block size.

The operation of the combinatorial encoder commences with establishment of that value of M, which is sufficient to encode the present value of the datum W. It is clear that the magnitude of W must be within the combinatorial capacity of the code. In the example of FIG. 2 a numerical value W=13 is beyond the capacity of the (2, 6) code, but within the capacity of the (4, 10) code example of FIG. 3c, which has fewer pulse widths in $T_w$. It is clear that for N available time slots of width $T_d$, the RZ constraint here adopted permits M=int (N/L) pulses and these will be distributable in but one way if N/L is an integer. If N/L has a remainder, additional freedom may be afforded. This maximum choice of M has only marginally increased the capacity of the code for the additional pulse(s) required. For the example of FIG. 2, a six symbol code can be realized from either of M=1 and M=3, or from M=2 alone. The capacity of M=1 and M=2 yields 11 symbols; M=3 adds but one symbol of capacity. Thus, for a known range of input, a choice may be permitted in selecting a subset of the possible values of M.

From the expression for C(L, M, N), and the prescriptions of L and N, the several combinatorial capacities are easily obtained. For the case S (L,N)=S(2,6) shown in FIG. 2 the results are collected in table 1 to form the basis of further discussion.

TABLE 1

| t | N | M = 3 | M = 2 | M = 1 | M = 0 |
|---|---|---|---|---|---|
| 1 | 6 | 1 | 6 | 5 | 1 |
| 2 | 5 | — | 3 | 4 | 1 |
| 3 | 4 | — | 1 | 3 | 1 |
| 4 | 3 | — | — | 2 | 1 |
| 5 | 2 | — | — | 1 | 1 |
| 6 | 1 | — | — | — | — |

At the first unit of time, t=1, the several combinatorial capacities are read horizontally and a horizontal sum expresses the total combinatorial capacity. (The case M=0 is here included as a valid datum.) As time advances along the vertical axis of the table, the number of available slots decreases and if a pulse has been emitted in the previous time slot, the number of remaining pulses decreases as well for a generally diagonal progression downwardly and toward 0 pulses.

For convenience, the index j will be taken as a sequential identifier for the pulses of an M-pulse sequence. The first pulse is labeled j=1, the second pulse labeled j=2, etc. For the case M−j=1 there is but one pulse remaining to be emitted. It is recognized that for a single pulse the time interval from the preceeding pulse is a simple linear conversion to time of the excess of the original datum W over the cumulative combinatorial capacity obtaining prior to emission of the previous pulse (j=M−1).

Figure 4A:
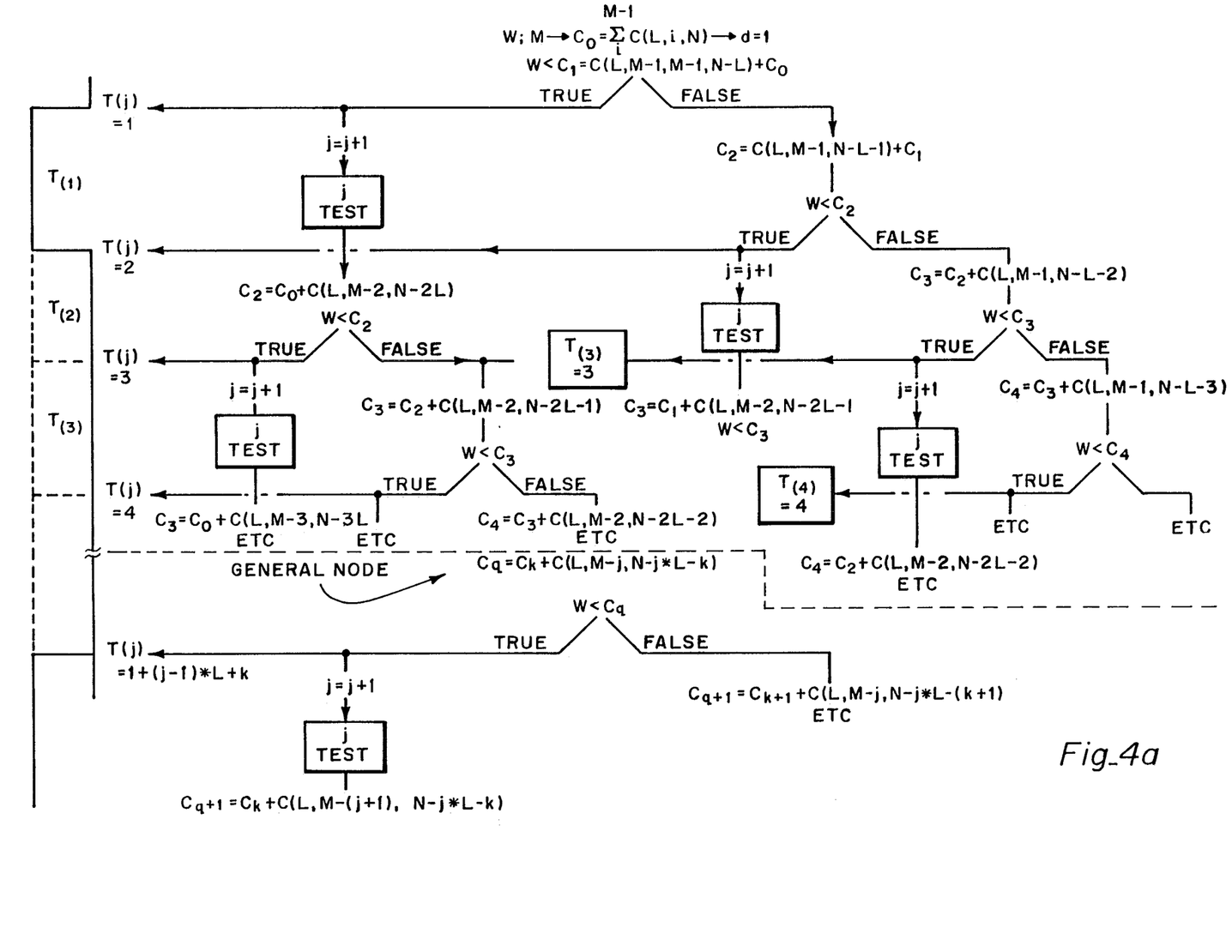
FIGS. 4a, b shows a decision tree for for encoding W<C(L,M,N)
Figure 4B:
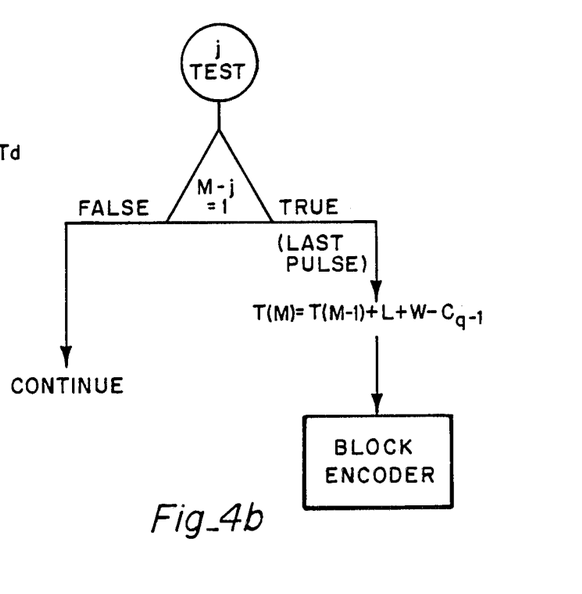

Although the final pulse is located by a simple linear conversion, the preceeding pulses are distributed according to a decision tree scematicized in FIG. 4. The decision tree discriminates among the input datum values to establish the class, subclass, etc for the corresponding pulse sequence. The combinatorial capacities against which W is tested are calculable as described above.

The generalization to be drawn from FIG. 4 is that a test of a datum W for comparison with cumlative combinatorial capacity at a general node of the decision tree results in either of two actions in accord with the true or false result of the comparison W less than cumulative combinatorial capacity. A true condition results in enabling a pulse at the earliest available time, reduction of the number of pulses remaining by 1 and reduction of the number of available pulse starting times by L. The condition M−j=1 is tested to properly place the final pulse on a true result. If the next pulse will not be the final pulse the indicated partial combinatorial capacity is computed and comulated for testing at the next communicating node. The false branch leading from the same general node preserves the number of pulses remaining, decreases the remaining available pulse starting times by 1, computes the indicated cumulative combinatorial capacity for testing at the next node.

Figure 5:
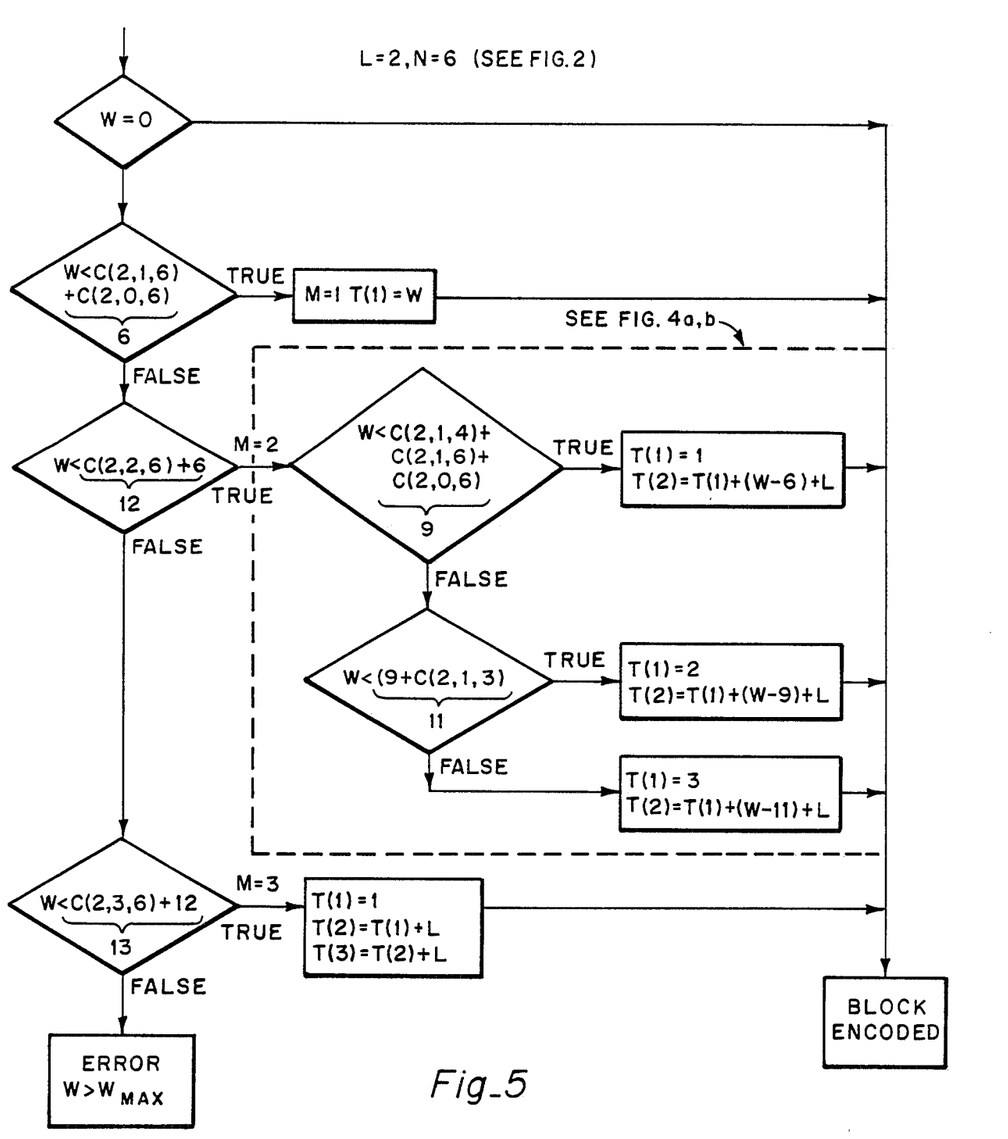
FIG. 5 is an application of the decision tree to an example code.

For the example of FIG. 2, a simplified flow chart is shown in FIG. 5 to illustrate the encoding operation. With the aid of FIG. 4 (the general case) and FIG. 5 some specific examples will be discussed.

It is first necessary to establish M such that W is encodeable. For a simple counting sequence the value of W is directly comparable with the cumulative combinatorial capacity. M can be determined from calculation or from a table such as the top (t=1) row of table 1, where W is tested successively against the cumulative sum 1, (1+5), (1+5+6) and (1+5+6+1) successively until the condition $$W < \sum_{i=0}^{M} C(L,i,N)$$

is true. Thus for the two cases W=8 or 10, neither M=0 nor M=1 will suffice and M=2 is required.

To proceed with the encoding it is necessary to test whether a pulse should be emitted at the next available time. Initially, the next available time is the first pulse time, t=1. The test is structured by computing the partial combinatorial capacity remaining after the emission of a pulse at t=1, eg. C (L, M−1, N−1*L). If W<C (L, M−1, N−1*L) then W is within that class of pulse sequences wherein a pulse is emitted at t=1 and that pulse position is established. For the general case each remaining partial combinatorial capacity for (M−j)>1 can be regarded as a subclass ultimately including the final pulse positions where (M−j)=1.

For the simple example at hand where W values 8 and 10 are considered, the test $$W < \left( C(L,M-1,N-1*L) + \sum_{i=0}^{M} C(L,i,N) \right)$$

reduces to a test W<9. W=8 is therefore of the class for which a pulse is emitted at t=1 and W=10 is not. A true condition at the first node of the decision tree (for the input value W=8) enables a single pulse for emission and would not enable such pulses for W=10. The position of a final pulse of the M=2 pulse sequence is measured from the last preceeding pulse or from the terminus of T. The measure is the difference between W and that cumulative combinatorial capacity which places W in the class. For W=8, the difference $$\left( C(L,M-1,N-1*L) + \sum_{i=0}^{M} C(L,i,N) \right) - W = 9 - 8 = 1,$$

thereby placing the last pulse at N−1=5. The position of the last pulse can as well be measured in displacement from the next available pulse starting time following the preceeding pulse. For this (completely equivalent) form of determining the position of the last pulse, the relevant cumulative capacity is that obtaining up to the current subclass, eg. W−(C(L,M,N))=8−6=2. The position of the preceeding pulse was t=1 and the next available start time was t=3. Two additional units of delay place the last pulse at position t=5.

The case W=10 causes a false condition upon testing for the pulse emission at t=1. Refering to FIG. 4, a false condition decrements the available pulse positions but, by definition does not alter the number of pulses remaining. The remaining cumulative combinatorial capacity is incremented by the partial capacity C(L, M−1, N−L−1). For the example with W=10, the test for $$W < \left( C(L,M-1,N-L-1) + \sum_{i=0}^{M} C(L,i,N) \right)$$

compares 10<(3+6), a true condition. True condition procedures are then repeated: the pulse is enabled for the time t=2, indices are updated and the condition (M−j)=1 tested. For the value W=10, the next available pulse time following a pulse at t=2 would be t=4. Additional delay is found from $$W - \left( C(L,M-1,N-1*L) + \left( \sum_{i=0}^{M} C(L,i,N) \right) \right) =$$

$$(10 - (3 + 6)) = 1.$$

The last pulse is therefore initiated at t=4+1=5 to complete the sequence.

The discussion above was based upon FIG. 2 wherein L=2 with the consequence that the number of possible pulses is equal to the number of possible pulse start times. L has been treated expressly in the equation and therefore does not represent a difference of kind for the general case L>2.

Recovery of W from the demodulated pulse data is treated in a straightforward reverse of the encoding process. The number of pulses M limits the possible decoded value of W. The equivalent of the relevant portion of table 1 permits a simple computation of the partial capacity attributable to each pulse. Accumulating the partial capacity in order of the pulses received leads to a decoded value of W as follows. Assume that two pulses form the sequence and the first pulse occurs at t=2. From the total of 2 pulses it follows that W≧6, the cumulative capacity for M=0 and M=1. From the first pulse at t=2, the combinatorial capacity of a t=1 class has been exceeded: therefore W≧(3+6) the partial combinatorial capacity for two pulses is 6, plus the capacity for the first pulse at t=2, eg., 3. Because only one pulse remains it is only necessary to add to 3 the displacement of the second pulse from the first and W is decoded. For M pulses there will be M−1 terms in the cumulative combinatorial capacity plus the final linear increment for the Mth pulse. Let the position of the second pulse be t=4, or one added unit of delay to the t=2 pulse, plus L=2. The result folows that W=(1+3+6)=10.

Figure 6:
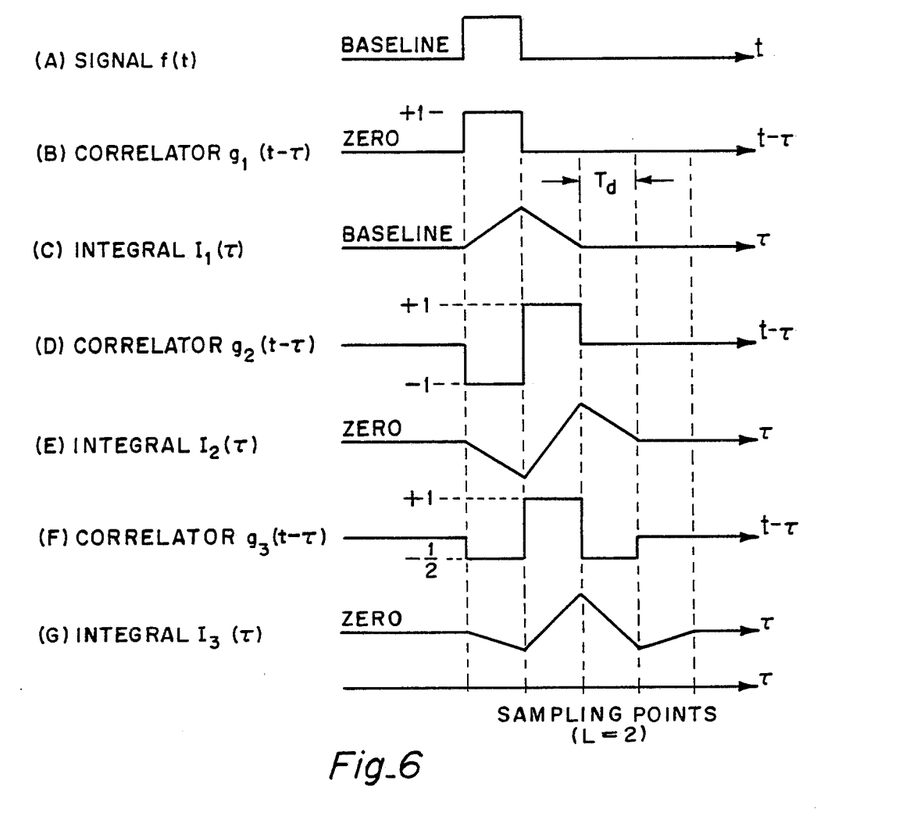
FIG. 6 illustrates and compares alternative correlator inputs and outputs.

The telemetry which is the goal of the present invention depends critically upon the recovery of an accurate representation of the transmitted pulse sequence in the presence of relatively high amplitude noise and relatively unpredictable smooth baseline time dependence. The correlator 29 operates upon the general input signal f(t) which includes a baseline time dependence and superimposed thereon at critical times, the modulation comprising the transmitted pulse p(t). FIG. 6A depicts an ideal flat baseline with a possible pulse added. Correlators generally operate by integrating the input signal f(t) with a correlation function g(t−) and presenting an output proportional to the integral. The parameter is an interval which is established by the synchronization associated adjustment to bring the function g(t−) into coincidence with the expected p(t). For a correlation function $g_1(t-\tau)$ identical to the pulse p(t) in shape and location (FIG. 6B) there results a correlator output $I_1(\tau)$ given by $$I_1(\tau) = \int_{-\infty}^{\infty} f(t) g_1(t - \tau) dt$$

shown at FIG. 6C. This function $I_1(\tau)$ spans the pulse and adjacent quiet period, I is baseline dependent and if $\tau$ is greater than a pulse width the average value of the baseline over the integration time will bias the function $I_1(\tau)$. A second order correlation function $g_2(t-\tau)$ normalized as indicated in FIG. 6D spans the pulse, no-pulse period to yield a signal $I_2(\tau)$ which exhibits a zero mean. The zero of the output signal is therefore known, independent of the base line amplitude. This desirable result is purchased at the expense of suppression of low frequency response, losing 3 dB in signal-to-noise ratio for white noise. Offsetting this is the advantage of baseline drift compensation.

The preferred correlator of the present invention operates upon the signal f(t) with a third order function $g_3(t-\tau)$ normalized to produce the zero mean and zero first moment as shown in FIG. 6F. The absolute value of the base line is compensated by the balance between the +1 amplitude central lobe and the −½ amplitude side lobes. The resulting output $I_3(\tau)$ shown in FIG. 6G characterized by both zero mean and vanishing first moment suppresses both the absolute base line amplitude and any linear time dependences. The function $g_3(t-\tau)$ occupies the maximum processing interval for assessing the presence of a legal RZ signal.

It is preferred to carry out the encoding and decoding as block functions upon the entire sequence. Particularly for the case of demodulator 28, it is desired to accumulate correlator output in a memory internal to demodulator 28 to facilitate decisional operations outside the scope of the present invention. This is not a requirement nor may such arrangement prove desirable for particular communication channels, code size, noise environment and like considerations. In such instance the present invention can be practiced in real time without departure from the significant elements thereof.

It has been noted above that the invention may be implemented theoretically from tabular lookup operations. It is instructive to consider that for a simple code wherein L=2 and N=5 supporting but 8 input symbols or 3 independent bits, the lookup ROM requires 32 bits. For a somewhat more realistic code, L=2 and N=20, the capacity is 10,940 input symbols (or 13.4 bits) and the lookup table capacity requires 207,974 bits. While this is still within acceptable economic considerations, a code for supporting 50+ bits in a message interval can be implemented with L=4 and N=110 with truly vast requirement ($1.46 \times 10^{17}$ bits) for ROM storage in a table lookup form. Such code transmits at a rate 0.91 bits/pulse width. For further comparison, the L=5, N=200 code supports a capacity of 80.1 bits (of input information) and transmits at 1.00 bits/pulse width.

The present invention has been successfully implemented in apparatus for measuring-while-drilling telemetry in a mud pulse channel. The downhole terminal derives data from magnetometers, accelerometers, and a temperature sensor. To this information an error checkword is computed and appended. This information is transmitted in a telemetry system capable of 68 bits/message interval using L=3, M=24, and N=130. A combinatorial capacity of approximately $3.26 \times 10^{20}$ accomodates the approximately $2.95 \times 10^{20}$ possible values of the data frame at a rate of 0.785 bits/pulse width.

Although mud pulse telemetry has been selected as the operative context of the illustrative example of the invention, it will be obvious that any communication channel including storage systems, similarly burdened by an unpredictable time dependent background may use the present invention profitably. It will be apparent that many changes could be made in the described method and apparatus and many apparently different embodiments could be made without departing from the scope thereof: It is therefore intended that all matter contained in the above description and shown in the drawings shall be interpreted as illustrative and not in a limiting sense.

What is claimed is:

1. The method of communicating a datum, W, across a communication channel from a data source to a data receiver, by a sequence of time displaced, nonadjacent, constant width pulses within a fixed time interval $T_w$ said time interval having beginning and final ends and being independent of said datum W, comprising the steps, (a) ordering a combinatorial set of said sequence of pulses, (b) determining from said datum, a particular one of said sequence of time displaced pulses of said combinatorial set,
(c) generating and transmitting said determined sequence of time displaced pulses across said communication channel,
(d) recovering said transmitted sequence of time displaced pulses from said communication channel, and
(e) performing the inverse of the determination of step (b) on the recovered sequence of pulses to obtain a representation of said datum W.

2. The method of claim 1 wherein said step of ordering comprises,
(a) classifying each pulse in said sequence of pulses by the time displacement thereof from one of said ends of said fixed time interval $T_w$,
(b) arranging said sequences in accord with the magnitude of the aggregate time displacement of the pulses of each said sequence.

3. The method of claim 2 wherein said step of determining comprises the steps of,
(a) ascertaining the partial combinatorial capacity for each additional pulse of a pulse sequence of said combinatorial set,
(b) ascertaining a cumulative sum of partial combinatorial capacities for said ordered set of sequences,
(c) associating the magnitude of said datum with the cumulative sum of partial combinatorial capacities for said ordered set of sequences, further comprising cumulating said sum from elements of the set taken in said order, whereby said datum W is associated with a unique pulse sequence.

4. The method of claim 1 wherein step (d) further comprises
(a) demodulating said transmitted pulse sequence to extract pulse information therefrom,
(b) preserving relative time displacements of respective pulses,
(c) detecting whether said time interval $T_w$ terminates in an interval occupied by a pulse and causing an error indication on that occurrence,
(d) totaling all pulses occuring in said message interval $T_w$ and causing an error indication on said total not equal to a predetemined quantity,
(e) initiating a request for repetition of transmission of said datum W from said data source upon the causation of an error indication.

5. The method of claim 2 further comprising transforming said recovered pulse time displacements to recover said datum W comprising the steps of
(a) computing the partial combinatorial capacity for each pulse of said recovered sequence,
(b) cumulating said partial combinatorial capacities into a sum S,
(c) associating said quantity S with a symbol, whereby said datum is recovered.

* * * * *